US011388650B2

(12) United States Patent
Li et al.

(10) Patent No.: US 11,388,650 B2
(45) Date of Patent: Jul. 12, 2022

(54) SYSTEM INFORMATION TRANSMISSION METHOD, TERMINAL DEVICE, AND NETWORK DEVICE

(71) Applicant: Huawei Technologies Co., Ltd., Shenzhen (CN)

(72) Inventors: Sainan Li, Chengdu (CN); Yalin Liu, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/664,185

(22) Filed: Oct. 25, 2019

(65) Prior Publication Data

US 2020/0084702 A1    Mar. 12, 2020

Related U.S. Application Data

(63) Continuation of application No. PCT/CN2018/085030, filed on Apr. 28, 2018.

(30) Foreign Application Priority Data

Apr. 28, 2017    (CN) .......................... 201710290940.2

(51) Int. Cl.
*H04W 48/10*     (2009.01)
*H04W 28/06*     (2009.01)
*H04W 48/14*     (2009.01)

(52) U.S. Cl.
CPC ........... *H04W 48/10* (2013.01); *H04W 28/06* (2013.01); *H04W 48/14* (2013.01)

(58) Field of Classification Search
CPC .............................. H04W 28/06; H04W 48/14
See application file for complete search history.

(56) References Cited

U.S. PATENT DOCUMENTS

| | | | |
|---|---|---|---|
| 10,911,943 B2* | 2/2021 | Chou | H04L 27/2613 |
| 2008/0268878 A1 | 10/2008 | Wang et al. | |
| 2010/0255859 A1* | 10/2010 | Park | H04W 68/025 455/458 |

(Continued)

FOREIGN PATENT DOCUMENTS

| | | |
|---|---|---|
| CN | 101669384 A | 3/2010 |
| CN | 105993192 A | 10/2016 |

(Continued)

OTHER PUBLICATIONS

Samsung, "Way forward on index based approaches", 3GPP Draft; R2-1700313, Jan. 17, 2017 (Jan. 17, 2017). XP051210894, 6 pages.
Mediatek Inc., "Comparison of Methods for Stored System Information", 3GPP Draft; R2-1701326, Feb. 12, 2017 (Dec. 12, 2017), XP051211990, 4 pages.

(Continued)

*Primary Examiner* — Muthuswamy G Manoharan
(74) *Attorney, Agent, or Firm* — Slater Matsil, LLP

(57) ABSTRACT

A method includes: broadcasting, by a network device, a minimum system information (MSI) message, where identification information of each SIB/system information block group in the MSI message includes an identifier of the SIB/system information block group and a type indication of the identifier, and the type indication of the identifier is used to indicate that a type of the identifier of the SIB/system information block group is an area specific system information identifier or a cell specific system information identifier. A corresponding terminal device and network device are also disclosed.

19 Claims, 7 Drawing Sheets

(56) References Cited

U.S. PATENT DOCUMENTS

| | | | |
|---|---|---|---|
| 2015/0223148 A1 | 8/2015 | Shi et al. | |
| 2017/0094688 A1 | 3/2017 | Lee et al. | |
| 2018/0132168 A1* | 5/2018 | Ingale | H04W 48/12 |
| 2019/0223094 A1* | 7/2019 | Ingale | H04W 48/14 |
| 2019/0230588 A1* | 7/2019 | Kim | H04W 48/20 |
| 2019/0253956 A1* | 8/2019 | Fujishiro | H04W 48/10 |
| 2019/0364462 A1* | 11/2019 | Kim | H04W 36/00 |
| 2020/0120546 A1* | 4/2020 | Zhang | H04W 36/0072 |

FOREIGN PATENT DOCUMENTS

| | | |
|---|---|---|
| CN | 106559905 A | 4/2017 |
| JP | 2019516310 A | 6/2019 |
| WO | 2016169714 A1 | 10/2016 |
| WO | 2018084201 A1 | 5/2018 |

OTHER PUBLICATIONS

Intel Corporation, "System information for standalone NR deployment", 3GPP Draft; R2-166885, Oct. 1, 2016 (Oct. 1, 2016), XP051162296, 6 pages.

3GPP TS 38.331 V0.0.2 (Mar. 2017),3rd Generation Partnership Project;Technical Specification Group Radio Access Network;NR-;Radio Resource Control (RRC);Protocol specification(Release 15 ),total 13 pages.

Huawei, HiSilicon, Structure of SIB Index/Identifier. 3GPP TSG-RAN WG2 Meeting #97bis, R2-1702620, Apr. 3-7, 2017, 3 pages, Spokane, Washington, USA.

Gemalto N.V., System Information for NR including ID and version tag. 3GPP TSG-RAN WG2 #95bis, R2-166132, Oct. 10-14, 2016, 3 pages, Kaohsiung, Taiwan.

\* cited by examiner

SYSTEM INFORMATION TRANSMISSION METHOD, TERMINAL DEVICE, AND NETWORK DEVICE

CROSS-REFERENCE TO RELATED APPLICATIONS

This application is a continuation of International Application No. PCT/CN2018/085030, filed on Apr. 28, 2018, which claims priority to Chinese Patent Application No. 201710290940.2, filed on Apr. 28, 2017. The disclosures of the aforementioned applications are hereby incorporated by reference in their entireties.

TECHNICAL FIELD

This application relates to the communications field, and in particular, to a system information transmission method, a terminal device, and a network device.

BACKGROUND

To meet a requirement of a next-generation communications system on a large capacity, a high-frequency band greater than 6 GHz is introduced for communication, to use high-bandwidth and high-rate transmission. Due to a high path loss of high-frequency communication, a narrow beam needs to be used to ensure a propagation distance and a high beam gain. However, the narrow beam has limited coverage. To ensure communication quality, narrow beam alignment between a network device and a terminal device is required.

System information in a long term evolution (LTE) communications system is periodically broadcast and sent. When system information in a high-frequency system is to be sent, a network device needs to scan a plurality of beams to transmit the system information to the terminal device, to ensure coverage of an entire cell. If all system information is still periodically broadcast and sent, excessive resources of a network are occupied. In addition, because a high-frequency cell has relatively small coverage, high-frequency cells need to be distributed very densely to ensure coverage. When moving in a particular area, a terminal device hands over between different high-frequency cells very frequently, and most of content of system information in the high-frequency cells in the particular area is the same. In a schematic diagram of area distribution of high-frequency cells shown in FIG. 1, an area 1 includes a cell 1, a cell 2, and a cell 3, and most of system information in the three cells is the same; and similarly, an area 2 includes a cell 4 and a cell 5, and most of system information in the two cells is the same. If the terminal device needs to re-obtain all system information each time the terminal device enters a cell, excessive load is caused to a network.

Therefore, how to reduce network resource overheads when the network device sends system information has become a problem that needs to be urgently resolved.

SUMMARY

This application provides a system information transmission method, a terminal device, and a network device, to reduce network resource overheads for transmitting system information.

An aspect of this application provides a system information transmission method. The method includes: broadcasting, by a network device, a minimum system information (MSI) message, where the MSI message includes identification information of at least one system information block (SIB)/system information block group, identification information of each SIB/system information block group includes an identifier of the SIB/system information block group and a type indication of the identifier, the identifier of each SIB/system information block group is used to indicate a version of the SIB/system information block group, and the type indication of the identifier is used to indicate that a type of the identifier of the SIB/system information block group is an area specific system information identifier or a cell specific system information identifier. In this implementation, the network device broadcasts the identification information of the system information block/system information block group in the minimum system information message, and identification information corresponding to different identifiers is included based on the type of the identifier, thereby reducing network resource overheads.

In an implementation, a bit quantity of the identifier corresponds to the type of the identifier. In this implementation, that the bit quantity of the identifier corresponds to the type of the identifier may be that types of different identifiers correspond to different bit quantities. In this way, for example, for a cell specific index, an identifier of the cell specific index can be indicated by using a relatively small quantity of bits, thereby reducing network resource overheads.

In another implementation, the identification information of each SIB/system information block group further includes at least one of the following information: an indication indicating whether there is an identifier of a next SIB/system information block group, and an indication indicating whether a cell supports the system information. In this implementation, when the MSI message includes a plurality of pieces of identification information, whether there is the identifier of the next SIB/system information block group may be clearly indicated, and if the cell does not support the system information, UE does not need to read content from a subsequent field.

In still another implementation, the MSI message further includes scheduling information for at least one other system information block/other system information block group, and the other system information block/other system information block group is a SIB/system information block group other than a minimum system information block/minimum system information block group. In this implementation, the MSI message further includes the scheduling information, and the UE may directly obtain the at least one other system information block/other system information block group at a resource position corresponding to the scheduling information.

In still another implementation, the scheduling information is further used to indicate a quantity and/or an arrangement order of identification information of the at least one other system information block/other system information block group. In this implementation, if the MSI message further includes the scheduling information, the MSI message does not need to include the indication indicating whether there is the identifier of the next SIB/system information block group, and the indication indicating whether a cell supports the system information, and the scheduling information directly indicates the quantity and/or the arrangement order of the identification information of the at least one other system information block/other system information block group.

In still another implementation, the method further includes: receiving, by the network device, an obtaining request for at least one SIB/system information block group from a terminal device, where if an identifier of the at least one SIB/system information block group is partially the same as an identifier that is of at least one SIB/system information block group in a cell in an area and that is stored by the terminal device, the obtaining request is used to request to obtain at least one SIB/system information block group corresponding to an identifier that is in the identifier of the at least one SIB/system information block group and that is different from the stored identifier of the at least one SIB/system information block group; or if an identifier of the at least one SIB/system information block group is different from all of a stored identifier of at least one SIB/system information block group, the obtaining request is used to request to obtain all SIBs/system information block groups; and sending, by the network device, the at least one requested SIB/system information block group to the terminal device. In this implementation, if the terminal device sends the obtaining request for the SIB/system information block group to the network device, the network device receives the obtaining request and returns the requested SIB/system information block group. It should be noted that, if the SIB/system information block group is a minimum SIB/system information block group, the terminal device may read the SIB/system information block group from the broadcast MSI message, without obtaining the SIB/system information block group from the network device. If the MSI message includes the scheduling information for the SIB/system information block group, the terminal device may obtain the SIB/system information block group at the corresponding resource position. For example, if it is learned, based on the scheduling information, that the SIB/system information block group is being broadcast in another cell at the resource position corresponding to the scheduling information, the UE may receive the broadcast SIB/system information block group.

Another aspect of this application provides a network device. The network device has a function of implementing an action of the network device in the foregoing method. The function may be implemented by using hardware, or may be implemented by executing corresponding software by hardware. The hardware or the software includes one or more modules corresponding to the foregoing function.

In a possible implementation, the network device includes: a sending unit, configured to broadcast a minimum system information MSI message, where the MSI message includes identification information of at least one system information block SIB/system information block group, identification information of each SIB/system information block group includes an identifier of the SIB/system information block group and a type indication of the identifier, the identifier of each SIB/system information block group is used to indicate a version of the SIB/system information block group, and the type indication of the identifier is used to indicate that a type of the identifier of the SIB/system information block group is an area specific system information identifier or a cell specific system information identifier.

In another possible implementation, the network device includes a receiver, a transmitter, a memory, and a processor, where the memory stores a set of program code, and the processor is configured to invoke the program code stored in the memory, to perform the following operation: broadcasting, by using the transmitter, a minimum system information MSI message, where the MSI message includes identification information of at least one system information block SIB/system information block group, identification information of each SIB/system information block group includes an identifier of the SIB/system information block group and a type indication of the identifier, the identifier of each SIB/system information block group is used to indicate a version of the SIB/system information block group, and the type indication of the identifier is used to indicate that a type of the identifier of the SIB/system information block group is an area specific system information identifier or a cell specific system information identifier.

Based on a same invention concept, for a problem resolving principle and beneficial effects of the apparatus, refer to the foregoing possible method implementations of the network device and beneficial effects that are brought about. Therefore, for implementation of the apparatus, refer to the implementation of the method. Repeated parts are not described again.

Still another aspect of this application provides a system information transmission method. The method includes: when a terminal device moves to a target cell, receiving, by the terminal device, a minimum system information MSI message from a network device corresponding to the target cell, where the MSI message includes identification information of at least one system information block SIB/system information block group, identification information of each SIB/system information block group includes an identifier of the SIB/system information block group and a type indication of the identifier, the identifier of each SIB/system information block group is used to indicate a version of the SIB/system information block group, and the type indication of the identifier is used to indicate that a type of the identifier of the SIB/system information block group is an area specific system information identifier or a cell specific system information identifier; and further performing, by the terminal device, at least one of the following steps: if an identifier of at least one SIB/system information block group in the target cell is partially the same as an identifier that is of at least one SIB/system information block group in a cell in an area and that is stored by the terminal device, obtaining, by the terminal device, at least one SIB/system information block group corresponding to an identifier that is in the identifier of the at least one SIB/system information block group in the target cell and that is different from the stored identifier of the at least one SIB/system information block group; or if an identifier of at least one SIB/system information block group in the target cell is different from all of a stored identifier of at least one SIB/system information block group, obtaining, by the terminal device, all SIBs/system information block groups in the target cell. It should be noted that, if the identifier of the at least one SIB/system information block group in the target cell is the same as all of the identifier that is of the at least one SIB/system information block group in the cell in the area and that is stored by the terminal device, the terminal device does not need to obtain the at least one SIB/system information block group. In this implementation, the terminal device receives the identification information that is of the system information block/system information block group and that is broadcast by the network device in the minimum system information message, and identification information corresponding to different identifiers is included based on the type of the identifier, thereby reducing network resource overheads; and the terminal device compares the identifier of the SIB/system information block group in the target cell and the stored identifier of the SIB/system information block group, to obtain only a SIB/system information block group having a different identifier, thereby further reducing network resource overheads, and improving efficiency of obtaining system information.

In an implementation, before the obtaining; by the terminal device, at least one SIB/system information block group or all SIBs/system information block groups, the method further includes: comparing, by the terminal device based on the type of the identifier of the at least one SIB/system information block group in the target cell, an identifier of at least one piece of cell specific system information in the target cell with a stored identifier of at least one piece of cell specific system information in the target cell, and an identifier of at least one piece of area specific system information in the target cell with a stored identifier of at least one piece of area specific system information in the cell in the area respectively, to determine whether the identifier of the at least one SIB/system information block group in the target cell is the same as the stored identifier of the at least one SIB/system information block group. In this implementation, identifiers of different types are respectively compared, to obtain SIBs/system information block groups having different identifiers, thereby improving comparison efficiency.

In another implementation, after the receiving, by a terminal device, a minimum system information MSI message from a network device corresponding to a target cell, the method further includes: obtaining, by the terminal device, the type of the identifier of each SIB/system information block group in the identification information of the SIB/system information block group, and obtaining an identifier that is of the SIB/system information block group and that is indicated in a bit quantity corresponding to the type of the identifier, where the bit quantity of the identifier corresponds to the type of the identifier. Specifically, the terminal device sequentially reads the type of the identifier of each SIB/system information block group from the identification information of the SIB/system information block group, and reads the identifier that is of the SIB/system information block group and that is indicated in the bit quantity corresponding to the type of the identifier.

In still another implementation, after the obtaining, by the terminal device, the at least one SIB/system information block group, the method further includes: when the terminal device receives an update indication of a SIB/system information block group from the network device, receiving, by the terminal device, an MSI message from the network device, to obtain an identifier of at least one updated SIB/system information block group; and if the identifier of the at least one updated SIB/system information block group is partially the same as the identifier that is of the at least one SIB/system information block group in the target cell and that is stored by the terminal device, obtaining, by the terminal device, at least one SIB/system information block group corresponding to an identifier that is in the identifier of the at least one updated SIB/system information block group and that is different from the stored identifier of the at least one SIB/system information block group in the target cell; or if the identifier of the at least one updated SIB/system information block group is different from all of the stored identifier of the at least one SIB/system information block group in the target cell, obtaining, by the terminal device, all the updated SIBs/system information block groups. In this implementation, the SIB/system information block group is updated. For the SIB/system information block group that needs to be obtained by UE, in a possible case, if the SIB/system information block group is MSI, the UE reads the SIB/system information block group from the broadcast MSI message. In another possible case, if the SIB/system information block group is OSI, the UE may send an SI obtaining request to the network device to obtain the SIB/system information block group. The network device receives the obtaining request from the UE, where if the identifier of the at least one updated SIB/system information block group is partially the same as the identifier that is of the at least one SIB/system information block group in the target cell and that is stored by the terminal device, the obtaining request is used to obtain at least one SIB/system information block group corresponding to an identifier that is in the identifier of the at least one updated SIB/system information block group and that is different from the stored identifier of the at least one SIB/system information block group in the target cell; or if the identifier of the at least one updated SIB/system information block group is different from all of the stored identifier of the at least one SIB/system information block group in the target cell, the obtaining request is used to obtain all the updated SIBs/system information block groups. In still another possible case, scheduling information for the SIB/system information block group is read from MSI, to obtain the SIB/system information block group at a corresponding resource position. For example, if it is learned, based on the scheduling information, that the SIB/system information block group is being broadcast in another cell at the resource position corresponding to the scheduling information, the UE may receive the broadcast SIB/system information block group.

Still another aspect of this application provides a terminal device. The terminal device has a function of implementing an action of the terminal device in the foregoing function. The function may be implemented by using hardware, or may be implemented by executing corresponding software by hardware. The hardware or the software includes one or more modules corresponding to the foregoing function.

In a possible implementation, the terminal device includes: a receiving unit, configured to: when the terminal device moves to a target cell, receive a minimum system information (MSI) message from a network device corresponding to the target cell, where the MSI message includes identification information of at least one system information block (SIB)/system information block group, identification information of each SIB/system information block group includes an identifier of the SIB/system information block group and a type indication of the identifier, the identifier of each SIB/system information block group is used to indicate a version of the SIB/system information block group, and the type indication of the identifier is used to indicate that a type of the identifier of the SIB/system information block group is an area specific system information identifier or a cell specific system information identifier; and an obtaining unit, configured to perform at least one of the following steps: if an identifier of at least one SIB/system information block group in the target cell is partially the same as an identifier that is of at least one SIB/system information block group in a cell in an area and that is stored by the terminal device, obtaining, by the terminal device, at least one SIB/system information block group corresponding to an identifier that is in the identifier of the at least one SIB/system information block group in the target cell and that is different from the stored identifier of the at least one SIB/system information block group; or if an identifier of at least one SIB/system information block group in the target cell is different from all of a stored identifier of at least one SIB/system information block group, obtaining, by the terminal device, all SIBs/system information block groups in the target cell.

In another possible implementation, the terminal device includes a receiver, a transmitter, a memory, and a processor, where the memory stores a set of program code, and the processor is configured to invoke the program code stored in the memory, to perform the following operation: when the terminal device moves to a target cell, receiving, by using the receiver, a minimum system information (MSI) message from a network device corresponding to the target cell, where the MSI message includes identification information of at least one system information block (SIB)/system information block group, identification information of each SIB/system information block group includes an identifier of the SIB/system information block group and a type indication of the identifier, the identifier of each SIB/system information block group is used to indicate a version of the SIB/system information block group, and the type indication of the identifier is used to indicate that a type of the identifier of the SIB/system information block group is an area specific system information identifier or a cell specific system information identifier; and the processor is further configured to perform at least one of the following steps: if an identifier of at least one SIB/system information block group in the target cell is partially the same as an identifier that is of at least one SIB/system information block group in a cell in an area and that is stored by the terminal device, obtaining at least one SIB/system information block group corresponding to an identifier that is in the identifier of the at least one SIB/system information block group in the target cell and that is different from the stored identifier of the at least one SIB/system information block group; or if an identifier of at least one SIB/system information block group in the target cell is different from all of a stored identifier of at least one SIB/system information block group, obtaining all SIBs/system information block groups in the target cell.

Based on a same invention concept, for a problem resolving principle and beneficial effects of the apparatus, refer to the foregoing possible method implementations of the terminal device and beneficial effects that are brought about. Therefore, for implementation of the apparatus, refer to the implementation of the method. Repeated parts are not described again.

Still another aspect of this application provides a computer-readable storage medium. The computer-readable storage medium stores an instruction, and when the instruction runs on a computer, the computer performs the method according to the foregoing aspects.

Still another aspect of this application provides a communications chip, storing an instruction. When the instruction runs on a network device or a terminal device, the computer performs the method according to the foregoing aspects.

Still another aspect of this application provides a computer program product including an instruction. When the instruction runs on a computer, the computer performs the method according to the foregoing aspects.

BRIEF DESCRIPTION OF THE DRAWINGS

To describe the technical solutions in the embodiments of the present invention or in the background more clearly, the following briefly describes the accompanying drawings required for describing the embodiments of the present invention or the background.

DETAILED DESCRIPTION OF ILLUSTRATIVE EMBODIMENTS

The following describes the embodiments of the present invention with reference to the accompanying drawings in the embodiments of the present invention.

A communications system in the embodiments of the present invention includes a network device and a terminal device. The communications system may be a global system for mobile communications (GSM), a code division multiple access (CDMA) system, and a wideband code division multiple access (WCDMA) system, a worldwide interoperability for microwave access (WiMAX) system, a long term evolution (LTE) system, a 5G communications system (for example, a new radio (NR) system), a communications system that integrates a plurality of communications technologies (for example, a communications system integrating an LTE technology and an NR technology), or a subsequent evolved communications system.

The terminal device in the embodiments of the present invention is a device having a wireless communication function, and may be a handheld device, an in-vehicle device, a wearable device, a computing device, another processing device connected to a wireless modem, or the like having a wireless communication function. The terminal device may have different names in different networks, for example, user equipment (UE), an access terminal, a subscriber unit, a subscriber station, a mobile station, a mobile console, a remote station, a remote terminal, a mobile terminal, a user terminal, a terminal, a wireless communications device, a user agent, a user apparatus, a cellular phone, a cordless phone, a session initiation protocol (SIP) phone, a wireless local loop (WLL) station, a personal digital assistant (PDA), or a terminal device in a 5G network or a future evolved network.

The network device in the embodiments of the present invention is a device deployed in a radio access network and configured to provide a wireless communication function, and includes but is not limited to: a base station (for example, a BTS (BTS), a NodeB (NB), an evolved NodeB (eNB or eNodeB), a transmission and reception point or a transceiver point (TRP or TP) in an NR system, a next generation NodeB (generation nodeB, gNB), or a base station or a network device in a future communications network), a relay node, an access point, an in-vehicle device, a wearable device, a wireless fidelity (Wi-Fi) site, a wireless backhaul node, a small cell, a micro station, and the like.

Figure 2:
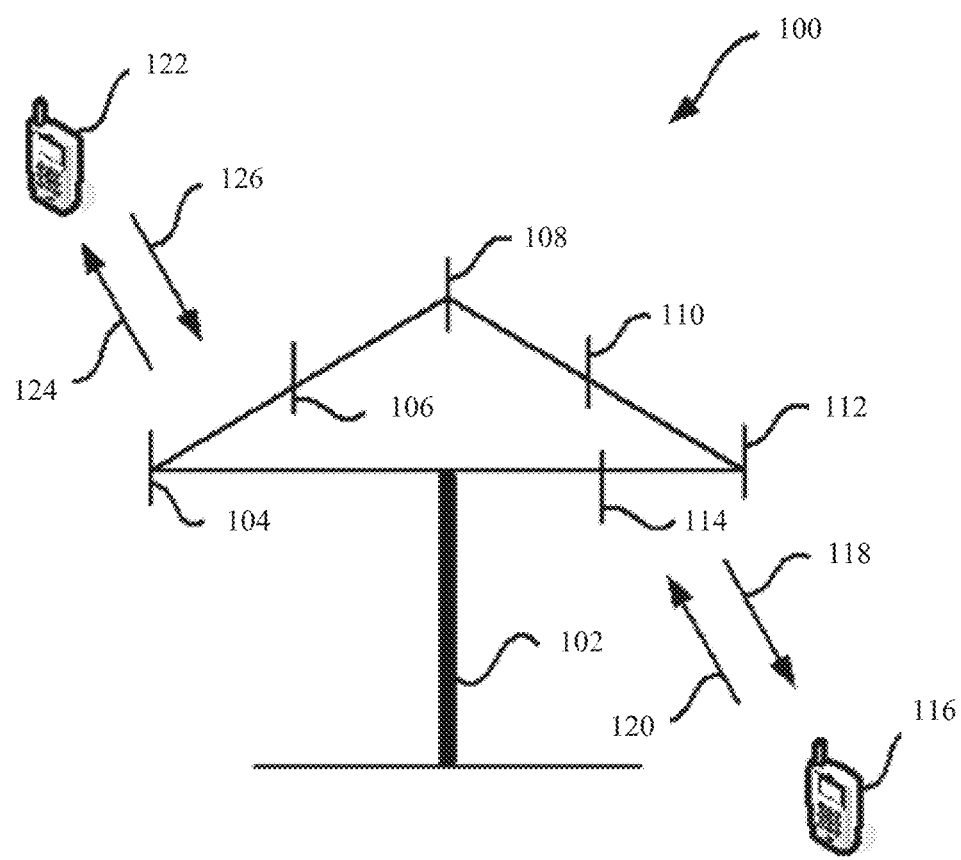
FIG. 2 is a schematic architectural diagram of an example of a communications system according to an embodiment of the present invention.

Specifically, FIG. 2 is a schematic architectural diagram of an example of a communications system according to an embodiment of the present invention. In FIG. 2, a base station 102 may include a plurality of antenna groups. Each antenna group may include one or more antennas. For example, one antenna group may include antennas 104 and 106, and another antenna group may include antennas 108 and 110. In addition, an additional group may be further included, and the additional group may include antennas 112 and 114. Different antenna groups in high-frequency communication may be combined into different antenna panels. For example, one antenna group generates a beam, pointing to a direction, and the another antenna group generates another beam, pointing to another direction. To achieve different device capabilities, more antennas may be required. Therefore, depending on the different device capabilities, the additional group may be set to have different quantities of antennas. For example, as shown in FIG. 2, each antenna group has two antennas; however, each group may use more or fewer antennas. The base station 102 may additionally include a transmitter chain and a receiver chain, and a person of ordinary skill in the art may understand that both the transmitter chain and the receiver chain may include a plurality of components, for example, a processor, a modulator, a multiplexer, a demodulator, a demultiplexer, or an antenna, related to signal sending and receiving.

The base station 102 may communicate with one or more terminal devices, for example, communicate with a terminal device 116 and a terminal device 122. However, it may be understood that, the base station 102 may communicate with any quantity of terminal devices similar to the terminal device 116 or 122. As shown in FIG. 2, the terminal device 116 communicates with the antennas 112 and 114. The antennas 112 and 114 send information to the terminal device 116 through a forward link 118, and receive information from the terminal device 116 through a reverse link 120. In addition, the terminal device 122 communicates with the antennas 104 and 106. The antennas 104 and 106 send information to the terminal device 122 through a forward link 124, and receive information from the terminal device 122 through a reverse link 126. In a frequency division duplex (FDD) system, for example, the forward link 118 may use a frequency band different from that used by the reverse link 120, and the forward link 124 may use a frequency band different from that used by the reverse link 126. In addition, in a time division duplex (TDD) system, the forward link 118 and the reverse link 120 may use a same frequency band, and the forward link 124 and the reverse link 126 may use a same frequency band.

An area covered by each group of antennas designed for communication and/or an area covered by transmission of each group of antennas is referred to as a sector of the base station 102. For example, the antenna group may be designed to communicate with a terminal device in a sector within coverage of the base station 102. In a process in which the base station 102 communicates with the terminal devices 116 and 122 respectively through the forward links 118 and 124, signal-to-noise ratios of the forward links 118 and 124 can be improved through beamforming by a transmit antenna of the base station 102. In addition, compared with a manner in which a base station sends, through a single antenna, signals to all terminal devices accessing the base station, when the base station 102 sends, through beamforming, signals to the terminal devices 116 and 122 that are randomly dispersed within related coverage, a mobile node in a neighboring cell is subject to less interference.

At a given time, the base station 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain, for example, generate, receive from another communications apparatus, or store in a memory, a particular quantity of data bits to be sent to the wireless communications receiving apparatus through a channel. Such a data bit may be included in a transport block or a plurality of transport blocks of data, and the transport blocks may be segmented to produce a plurality of code blocks.

It should be noted that the terms "system" and "network" in the embodiments of the present invention may be used interchangeably. "A plurality of" means two or more, and in view of this, "a plurality of" may also be understood as "at least two" in the embodiments of the present invention. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

Figure 3:
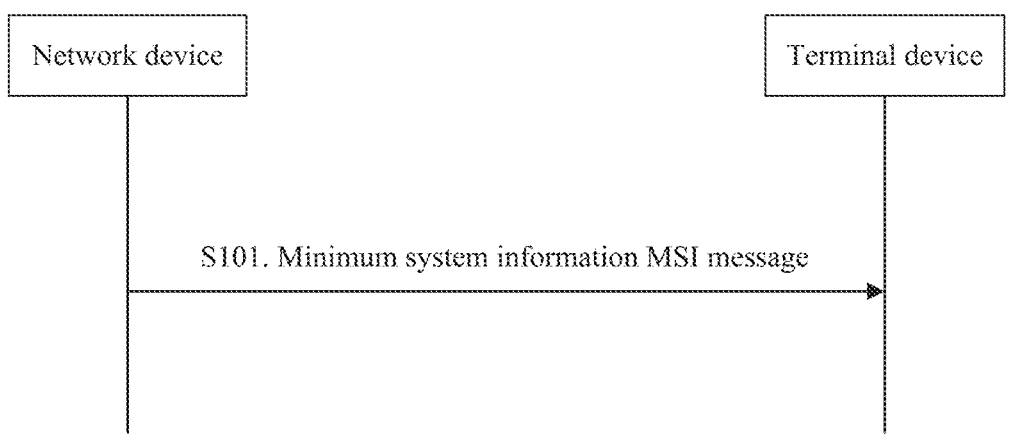
FIG. 3 is a schematic interaction flowchart of a system information transmission method according to an embodiment of the present invention.

FIG. 3 is a schematic interaction flowchart of a system information transmission method according to an embodiment of the present invention. The method may include the following steps.

S101. A network device broadcasts a minimum system information message.

In this embodiment, system information is organized by using system information blocks (SIB), and each SIB aggregates parameter content related to a function. Defined SIBs mainly include: (1) a master information block (MIB): a basic parameter required when UE initially accesses a network; (2) a SIB 1: a parameter related to cell access and cell selection, and time domain scheduling information for another SIB; (3) a SIB 2: public radio resource configuration information; (4) a SIB 3 to a SIB 8: parameters used to control intra-frequency, inter-frequency, and inter-RAT cell reselection; (5) a home base station name; and (6) a SIB 10 to a SIB 12: an earthquake or tsunami warning message, and the like. The MIB is carried by using a physical broadcast channel (Physical Broadcast Channel, PBCH), and a transmission period is fixedly 40 ms. The SIB 1 is carried by using a physical downlink shared channel (Physical Downlink Shared Channel, PDSCH), and a transmission period is fixedly 80 ms. The other SIBs are included in a system information block group (an SI message) and transmitted through scheduling. Each SI message may include one or more SIBs, the SI message is carried by using a PDSCH, and a transmission period is configurable, so that it may also be considered that the system information is organized by using SI messages. Parameter content of each SIB may vary in different communications systems, and this is not limited herein.

In this embodiment, some most minimum and most important system information used by the UE to access a network is used as MSI (Minimum SI), for example, the MIB, the SIB 1, and the SIB 2, and is periodically broadcast and sent. Other system information is sent as OSI (Other SI) according to a requirement, sending of some OSI needs to be scheduled with a request of the UE, and sending of the other OSI is triggered on a network side, to save system resources. Minimum system information blocks such as the MIB, the SIB 1, and the SIB 2 are broadcast in one message, and it may be considered that one MSI message includes these minimum system information blocks.

For a next-generation mobile communications system such as 5G, a high-frequency cell has relatively small coverage, and high-frequency cells need to be distributed very densely to ensure coverage. When moving in a particular area, the UE hands over between different high-frequency cells very frequently. Most of content of system information in the high-frequency cells in the particular area is the same. If the UE needs to re-obtain all system information each time the UE enters a cell, excessive load is caused to a network. Therefore, the MSI message includes identification information of one or more SIBs/SI messages, and the SIB/SI message may include MSI and OSI, or may include only OSI. Further, identification information of each SIB/SI message includes an identifier of the SIB/SI message and a type indication of the identifier. The identifier is, for example, an index of the SIB/SI message, namely, an index. An example in which the identifier is an index is used for description in the following descriptions. The index is used to identify a version of each SIB/SI message in a particular area (the version of the SIB/SI message corresponds to a particular parameter configuration of the SIB/SI message). The type indication of the identifier is used to indicate that a type of the identifier of the SIB/SI message is an area specific system information identifier (Area specific Index) or a cell specific system information identifier (Cell specific Index). In this way, the UE first reads an index from a broadcast MSI message when entering a cell, and if a system message version corresponding to the index is already stored by the UE, the UE does not need re-obtain content of system information corresponding to the index.

During specific implementation, the network is first divided into areas, and system information in each cell in an area is identified. A group of neighboring cells with most same system information may be divided into one area, or a tracking area (TA) may be used as an area in this embodiment. Area division is not limited in this embodiment. In addition, an area within a particular range may be identified. The identifier may include an area identifier, for example, the area identifier may be an index number of the area, and the index number may be specifically a numeral (system information Area id): 1, 2, . . . , or N (N is a positive integer). Area numbers exceeding a particular range may be repeated, provided that area identifiers (Area id) of system information in cells in one area are the same, and area ids of neighboring areas (or relatively close areas) are different. Numbers of system information in one area cannot be repeated, and numbers of system information in different areas may be repeated.

The identified system information may be a single SIB or a combination of a plurality of SIBs (an SI message), to be specific, each SIB corresponds to one index, or each SI message corresponds to one index. SIBs/SI messages in the area may have different versions (include different parameter content). For example, in a schematic diagram of identifiers of different versions in an area shown in FIG. 4, SIBxs in a cell 1 and a cell 2 in an area 1 (Area 1) have a same version/same content, and correspond to an identifier Index1, and a SIBx in a cell 3 has a version different from that in the cell 1 and the cell 2, and corresponds to an identifier Index2. Therefore, SIBxs in different cells correspond to different indexes. In an area 2 (Area 2), there is an index of a SIBx that is the same as that in the area 1. Because indexes in different areas may be repeatedly numbered, a same index in the area 2 and the area 1 may correspond to different versions of SIBxs, to be specific, correspond to different parameter content.

Figure 4:
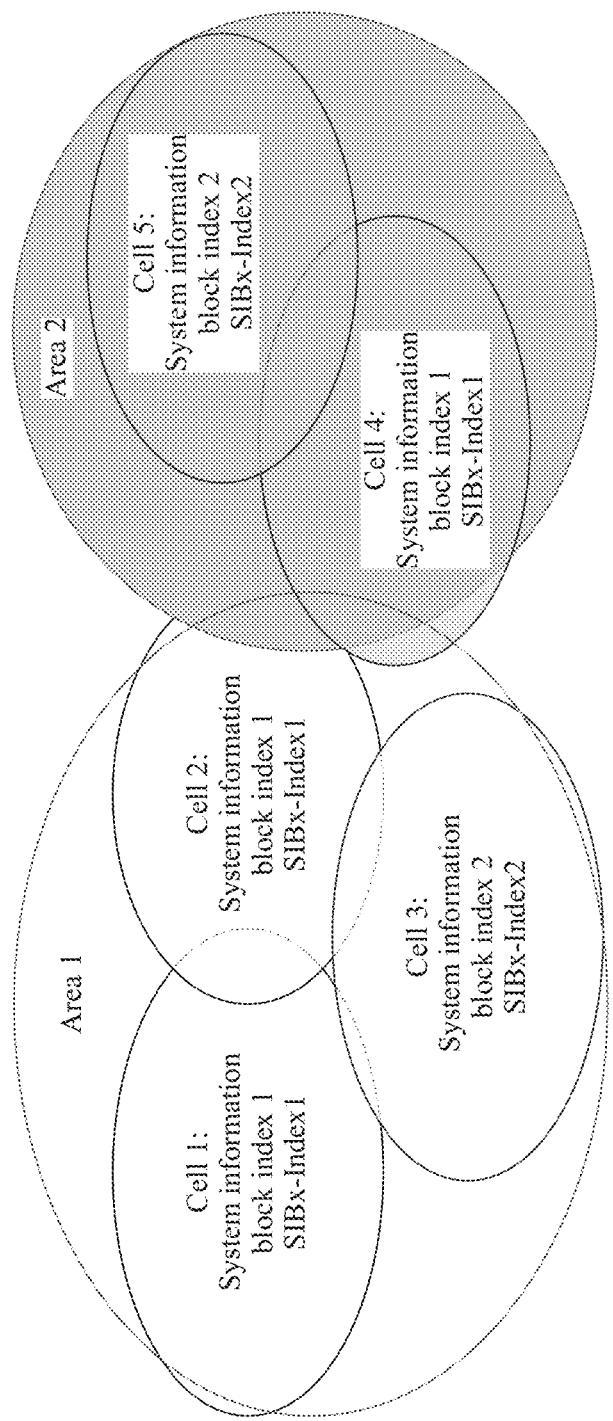
FIG. 4 is a schematic diagram of identifiers of different versions in an area.

However, for SIBs/SI messages in an area, some versions may exist in a plurality of cells in the area, and the other versions are applicable only to a single cell in the area, for example, the SIBxs in the area 1 in FIG. 4, where a version of the SIBx-Index1 can be used in both cells: the cell 1 and the cell 2, while a version of the SIBx-Index2 can be used only in one cell: the cell 3. In this embodiment of the present invention, a version of a SIB/an SI message that can be used in a plurality of cells in an area is referred to as an area specific SIB/SI message, and a version of a SIB/an SI message that can be used only in one cell in the area is referred to as a cell specific SIB/SI message. The area specific SIB/SI message and the cell specific SIB/SI message are separately numbered, to be specific, an area specific version of each SIB/SI message is numbered by using an area specific index, and a cell specific version of each SIB/SI message is numbered by using a cell specific index, and 1 bit is added to indicate whether the index is an area specific index or a cell specific index, to form identification information of the area specific SIB/SI message or the cell specific SIB/SI message. Then one or more pieces of identification information are placed in the MSI message and broadcast (specifically, are carried in a minimum system information block in the MSI message, for example, carried in the SIB1).

Figure 1:
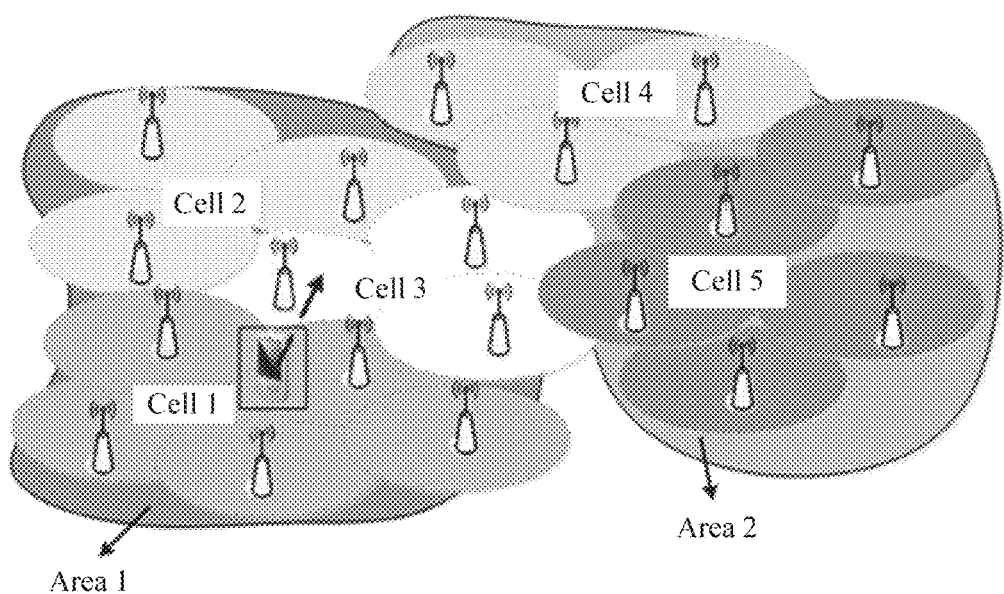
FIG. 1 is a schematic diagram of area distribution of high-frequency cells.

Therefore, area specific versions and cell specific versions of SIBs/SI messages are respectively numbered by using indexes, and fixed bit quantities may be respectively set for the two different indexes of each SIB/SI message. The area specific indexes of all the SIBs/SI messages may occupy a same quantity of bits or different quantities of bits. Similarly, the cell specific indexes of all the SIBs/SI messages may occupy a same quantity of bits or different quantities of bits. Usually, the area specific index and the cell specific index may correspondingly occupy different quantities of bits. In this way, because a number of the area specific index may be longer, more bits are required, while because a number of the cell specific index may be shorter, fewer bits are required. A length of the identification information can be reduced by corresponding to different bits based-on the type of the identifier, thereby reducing network resource overheads required by the network device to broadcast the MSI message. In addition, a 1-bit indication bit is added before the index, to indicate whether the index is an area specific index or a cell specific index. The identification information may be a structure parameter (SIB/SI message Index structure). The entire SIB/SI message index structure may have a word length that is dynamically adjusted, for example, a SIB/SI message index structure is shown in FIG. 1A.

The MSI message may include the identification information of each SIB/SI message (certainly, the MSI message may not include the identification information of all the SIBs/SI messages, for example, the SIBs 10 to 12 are SIBs that do not need to be actively obtained by the UE, and identification information of the SIBs 10 to 12 may not be included in the MSI message; some identification information that is in MSI and that is sent by using a PBCH may not be included in the MSI message; and some identification information that is in the MSI and that is sent by using a PDSCH may not be included in the MSI message).

The identification information of each SIB/SI message includes a 1-bit indication bit F, used to indicate whether the index is an area specific index or a cell specific index, and the identification information of the SIB/SI message further includes an index, where the index may be an area specific index or a cell specific index.

Optionally, the identification information of each SIB/SI message may further include a 1-bit indication bit O, used to indicate whether the cell supports the SIB/SI message. Considering that a SIB/an SI message is not supported in some cells, the indication bit may be defined. Certainly, the indication bit may not be defined, and it is default that each SIB/SI message in the SIB/SI message index structure is supported in all cells.

Further, the identification information of the SIB/SI message may further include a 1-bit indication bit E, used to indicate whether there is identification information of a next SIB/SI message. The indication bit may be optional. When the indication bit does not exist, the MSI message may include a fixed quantity of identification information of SIBs/SI messages, and the network device may notify the UE of the quantity of identification information. The UE reads the fixed quantity of identification information of SIBs/SI messages.

In addition, the identification information of the SIBs/SI messages in the MSI message may be arranged in a fixed order. An operation procedure of reading the SIB/SI message index structure by the UE is as follows: The UE sequentially reads the identification information of each SIB/SI message. If the indication bit O exists, the UE first determines, based on the indication bit O (o or 1), whether the SIB/SI message exists in the cell. If the indication bit O indicates that the SIB/SI message does not exist, the UE does not need to read the indication bit F, and considers by default that the index corresponding to the SIB/SI message is of o bits. If the indication bit O indicates that the SIB/SI message exists in the cell, the UE determines, based on the indication bit F (o or 1), whether the SIB/SI message is an area specific SIB/SI message or a cell specific SIB/SI message. If the SIB/SI message is an area specific SIB/SI message, the UE considers that a length of the index is a fixed bit quantity of an area specific version of the SIB/SI message, and reads the index of the fixed bit quantity. If the SIB/SI message is a cell specific SIB/SI message, the UE considers that a length of the index is a fixed bit quantity of a cell specific version of the SIB/SI message, and reads the index of the fixed bit quantity. In addition, if the indication bit O does not exist, the UE directly determines, based on the indication bit F (o or 1), whether the SIB/SI message is an area specific SIB/SI message or a cell specific SIB/SI message, determines a length of the index, and reads the index based on a determined bit quantity. If the indication bit E exists, the UE further needs to read the indication bit E, and determines, based on the indication bit E (o or 1), whether to read a next piece of identification information. If the indication bit E does not exist, the UE determines, based on a quantity of read identification information and the quantity of identification information of the SIBs/SI messages included in the MSI message, whether there is a next piece of identification information.

The indication bit O, the indication bit F, the index, and the indication bit E in each piece of identification information may be arranged and read in any arrangement order and reading order.

In this embodiment, the network device broadcasts the identification information of the SIB/SI message in the MSI message, and separately identifies the area specific version and the cell specific version of the SIB/SI message, to be specific, the identification information includes different identifiers based on the type of the identifier, so that the length of the identification information can be adjusted, thereby reducing network resource overheads.

For each high-frequency cell, identification information of each SIB/SI message in the cell is broadcast in MSI, and an area id corresponding to the cell may be further broadcast. Each time the UE enters a cell, the UE obtains identification information of each SIB/SI message in the cell and then may store the identification information of each SIB/SI message in the cell. Content stored by the UE includes a cell identifier (for example, a cell id or a physical cell identifier (PCI)) of the cell, an area id corresponding to the cell, the identification information of each SIB/SI message in the cell. A quantity of cells in which identification information of SIBs/SI messages is to be stored by the UE is determined by the UE, and may depend on a memory size of the UE. Therefore, each time the UE enters a high-frequency cell, the UE may obtain an identifier of the cell, and read, from an MSI message, an area id and identification information of each SIB/SI message that are broadcast. The UE may further determine, based on whether the UE stores the identification information of each SIB/SI message in the cell, SIBs/SI messages that need to be obtained.

According to the system information transmission method provided in this embodiment of the present invention, the network device broadcasts the identification information of the system information block/system information block group in the minimum system information message, and the identification information corresponding to the different identifiers is included based on the type of the identifier, thereby reducing network resource overheads.

Figure 5:
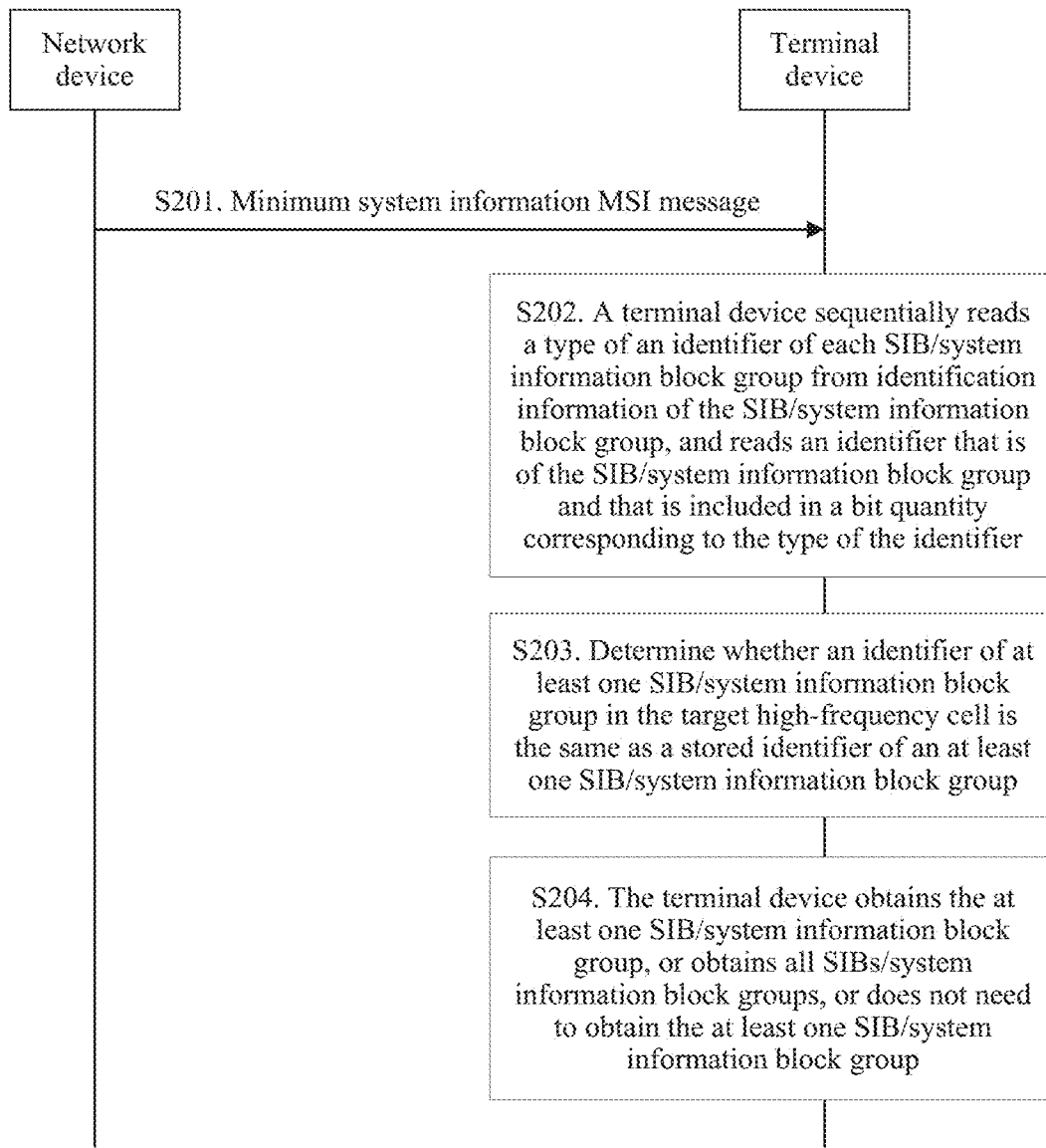
FIG. 5 is a schematic interaction flowchart of another system information transmission method according to an embodiment of the present invention.

FIG. 5 is a schematic interaction flowchart of another system information transmission method according to an embodiment of the present invention. The method may include the following steps.

S201. A network device broadcasts a minimum system information MSI message.

This step is the same as step S101 in the embodiment shown in FIG. 3, and details are not described herein again.

S202. The terminal device obtains a type of an identifier of each SIB/system information block group in identification information of the SIB/system information block group, and obtains an identifier that is of the SIB/system information block group and that is indicated in a bit quantity corresponding to the type of the identifier, where the bit quantity of the identifier corresponds to the type of the identifier.

For this step, refer to the operation procedure of reading the SIB/SI message index structure by the UE in the embodiment shown in FIG. 3.

Figure 10A:
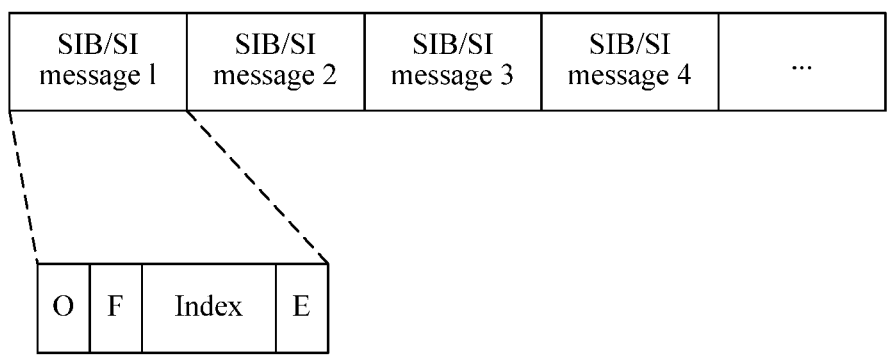
FIGS. 10A through 10C are example index configurations.
Figure 10B:
Figure 10C:
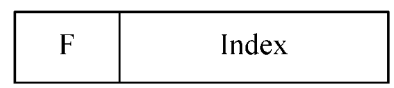

In addition, in a further implementation, identification information of each SIB/SI message included in the SIB/SI message index structure may be used as an independent parameter, so that the UE may randomly obtain identification information of a SIB/an SI message, without sequentially reading the identification information of each SIB/SI message in the SIB/SI message index structure to obtain the identification information of each SIB/SI message as the operation procedure described above. An index structure of each SIB/SI message is shown in FIG. 10B.

A difference from the foregoing embodiment lies in that, an indication bit E does not need to be defined in the SIB/SI message index structure to indicate whether there is identification information of a next SIB/SI message. Each indication bit and content included in the index in the SIB/SI message index structure are the same as those in the foregoing embodiment, and a reading procedure of the UE is also basically the same as the operation procedure of reading the SIB/SI message index structure by the UE in the foregoing embodiment:

The UE reads the identification information of the SIB/SI message. If an indication bit O exists, the UE first determines, based on the indication bit O (o or 1), whether the SIB/SI message exists in the cell. If the SIB/SI message does not exist in the cell, the UE does not need to read an indication bit F, and considers by default that an index corresponding to the SIB/SI message is of o bits. If the indication bit O indicates that the SIB/SI message exists in the cell, the UE determines, based on an indication bit F (o or 1), whether the SIB/SI message is an area specific SIB/SI message or a cell specific SIB/SI message. If the SIB/SI message is an area specific SIB/SI message, the UE considers that a length of the index is a fixed bit quantity of an area specific version of the SIB/SI message, and reads the index of the fixed bit quantity. If the SIB/SI message is a cell specific SIB/SI message, the UE considers that a length of the index is a fixed bit quantity of a cell specific version of the SIB/SI message, and reads the index of the fixed bit quantity. If the indication bit O does not exist, the UE directly determines, based on the indication bit F (o or 1), whether the SIB/SI message is an area specific SIB/SI message or a cell specific SIB/SI message, determines a length of the index, and reads the index based on a determined bit quantity.

A specific implementation in which the identification information of each SIB/SI message included in the SIB/SI message index structure is used as an independent parameter may be as follows: The identification information of each SIB/SI message is located at a fixed time-frequency resource position (the fixed time-frequency resource position may not be absolute), and the time-frequency resource position may be a time-frequency resource that is fixed relative to a time-frequency resource position of a message/parameter, for example, a distance of n OFDM symbols in time domain from the message, and a distance of m subcarriers (m and n are positive integers) in frequency domain from the message; or the identification information (carried by using a PDSCH) of the SIBs/SI messages is scheduled and indicated by using different DCI (Downlink Control Information). The foregoing specific implementation is merely an example, and this is not limited thereto during specific implementation. In this way, the UE can separately read the identification information of each SIB/SI message.

In another implementation, the MSI message may further include OSI scheduling information (which may be schedulingInfoList). The scheduling information may include scheduling information for each SIB/SI message, and the scheduling information for each SIB/SI message is arranged in total scheduling information in a particular fixed order. Therefore, an arrangement order of identification information of various pieces of OSI may be the same as an arrangement order of scheduling information for the various pieces of OSI in the scheduling information. If a SIB in MSI also needs to be numbered by using an index, identification information of the MSI is arranged before the identification information of the OSI in order. Therefore, a format of the identification information of each SIB/SI message is shown in FIG. 1C.

In this implementation, because the scheduling information indicates a quantity of and/or an arrangement order of identification information of other system information blocks/other system information block groups, the identification information of the SIB/SI message may include the indication bit F and content of the index. The indication bit F is used to indicate whether the SIB/SI message is an area specific SIB/SI message or a cell specific SIB/SI message. The content of the index is the same as that in the descriptions of the foregoing embodiment.

An operation procedure of reading the identification information of each SIB/SI message by the UE is as follows. The UE first learns, based on the scheduling information for the OSI included in the MSI message, of a total quantity of OSI whose identification information exists in the SIB/SI message index structure, and an arrangement order of the identification information of the SIBs/SI messages. Then the UE sequentially reads indexes of the SIBs/SI messages from the SIB/SI message index structure. The UE determines, based on the indication bit F (o or 1), whether the SIB/SI message is an area specific SIB/SI message or a cell specific SIB/SI message. If the SIB/SI message is an area specific SIB/SI message, the UE considers that a length of the index is a fixed bit quantity of an area specific version of the SIB/SI message, and reads the index of the fixed bit quantity. If the SIB/SI message is a cell specific SIB/SI message, the UE considers that a length of the index is a fixed bit quantity of a cell specific version of the SIB/SI message, and reads the index of the fixed bit quantity.

S203. The terminal device compares, based on a type of an identifier of at least one SIB/system information block group in a target cell, an identifier of at least one piece of cell specific system information in the target cell with a stored identifier of at least one piece of cell specific system information in the target cell, and an identifier of at least one piece of area specific system information in the target cell with a stored identifier of at least one piece of area specific system information in the cell in the area respectively, to determine whether the identifier of the at least one SIB/system information block group in the target cell is the same as the stored identifier of the at least one SIB/system information block group.

Whether the identifier of the SIB/SI message in the target cell is the same as the identifier that is of the SIB/SI message and that is stored by the UE is determined based on the type of the identification information of the SIB/SI message, to determine whether the UE stores the SIB/SI message in the target cell. Specifically, for a cell specific SIB/SI message, the UE may determine whether the UE stores a SIB/an SI message corresponding to the cell identifier. If the UE already stores the SIB/SI message corresponding to the cell identifier, the UE further determines through comparison whether the identifier of the cell specific SIB/SI message in the target cell is the same as an identifier that is of the cell specific SIB/SI message in the target cell and that is stored by the UE. If same indexes exist, the UE does not need to re-obtain a cell specific SIB/SI message corresponding to the same indexes, and the UE only needs to obtain a cell specific SIB/SI message corresponding to an index different from the indexes. For an area specific SIB/SI message, the UE may determine whether an area specific SIB/SI message corresponding to an area id is stored. If the UE already stores the area specific SIB/SI message corresponding to the area id, the UE further determines whether an index of an area specific SIB/SI message in the target cell is the same as an index that is of the area specific SIB/SI message corresponding to the area id and that is stored by the UE. If same indexes of an area specific SIB/SI message exist, the UE does not need to re-obtain a SIB/an SI message corresponding to the same indexes, and the UE only needs to obtain an area specific SIB/SI message corresponding to an index different from the indexes.

S204. The terminal device further performs at least one of the following steps: if an identifier of at least one SIB/system information block group in the target cell is partially the same as an identifier that is of at least one SIB/system information block group in a cell in an area and that is stored by the terminal device, obtaining, by the terminal device, at least one SIB/system information block group corresponding to an identifier that is in the identifier of the at least one SIB/system information block group in the target cell and that is different from the stored identifier of the at least one SIB/system information block group; or if an identifier of at least one SIB/system information block group in the target cell is different from all of a stored identifier of at least one SIB/system information block group, obtaining, by the terminal device, all SIBs/system information block groups in the target cell.

Whether the identifier of the SIB/SI message in the target cell is the same as the identifier that is of the SIB/SI message and that is stored by the UE is determined through step S203. Based on a determining result, if the identifier of the at least one SIB/system information block group in the target cell is partially the same as the identifier that is of the at least one SIB/system information block group in the cell in the area and that is stored by the terminal device, the terminal device obtains the at least one SIB/system information block group corresponding to the identifier that is in the identifier of the at least one SIB/system information block group in the target cell and that is different from the stored identifier of the at least one SIB/system information block group; or if the identifier of the at least one SIB/system information block group in the target cell is different from all of the stored identifier of the at least one SIB/system information block group, the terminal device obtains all the SIBs/system information block groups in the target cell. It should be noted that, if the identifier of the at least one SIB/system information block group in the target cell is the same as all of the identifier that is of the at least one SIB/system information block group in the cell in the area and that is stored by the terminal device, the terminal device does not need to obtain the at least one SIB/system information block group, and the terminal device does not need to perform the obtaining operation.

For the SIB/SI message that needs to be obtained by the UE, in a possible case, if the SIB/SI message is MSI, the UE reads the SIB/SI message from the broadcast MSI message. In another possible case, if the SIB/SI message is OSI, the UE may send an SI obtaining request to the network device to obtain the SIB/SI message, and the network device receives the obtaining request from the UE. If the identifier of the at least one SIB/system information block group is partially the same as the identifier that is of the at least one SIB/system information block group in the cell in the area and that is stored by the terminal device, the obtaining request is used to obtain the at least one SIB/system information block group corresponding to the identifier that is in the identifier of the at least one SIB/system information block group and that is different from the stored identifier of the at least one SIB/system information block group; or if an identifier of the at least one SIB/system information block group is different from all of a stored identifier of at least one SIB/system information block group, the obtaining request is used to obtain all the SIBs/system information block groups. In still another possible case, the scheduling information for the SIB/SI message is read from the MSI, to obtain the SIB/SI message at the corresponding resource position. For example, if it is learned, based on the scheduling information, that the SIB/SI message is being broadcast in the cell at the resource position corresponding to the scheduling information, the UE may receive the broadcast SIB/SI message.

It should be noted that, the SIB/SI message obtained by the terminal device should be a SIB/an SI message that needs to be obtained by the terminal device, and the SIB/SI message corresponding to the identifier of the SIB/SI message in the target cell that is compared by the terminal device with the identifier stored by the terminal device should also be a SIB/an SI message that needs to be obtained by the terminal device (because other SI that needs to be obtained by the terminal device is defined in a protocol, and some other SI may not be obtained by the terminal device).

In conclusion, the network device broadcasts the identification information of the system information block/system information block group in the minimum system information message, and identification information corresponding to different identifiers is included based on the type of the identifier, where a quantity of bits occupied by the identifier corresponds to the type of the identifier, thereby saving network system resources; and the terminal device determines, based on the type of the identifier, an identifier to be obtained, to obtain a system information block/system information block group not stored by the terminal device, thereby further saving network system resources.

Further, if the terminal device camps on the target cell, the SIB/SI message in the target cell may be updated. Therefore, in an implementation, after the terminal device obtains the at least one SIB/system information block group, the method may further include the following steps (not shown): when the terminal device receives an update indication of a SIB/system information block group from the network device, receiving, by the terminal device, an MSI message from the network device, to obtain an identifier of at least one updated SIB/system information block group; and if the identifier of the at least one updated SIB/system information block group is partially the same as the identifier that is of the at least one SIB/system information block group in the target cell and that is stored by the terminal device, obtaining, by the terminal device, at least one SIB/system information block group corresponding to an identifier that is in the identifier of the at least one updated SIB/system information block group and that is different from the stored identifier of the at least one SIB/system information block group in the target cell; or if the identifier of the at least one updated SIB/system information block group is different from all of the stored identifier of the at least one SIB/system information block group in the target cell, obtaining, by the terminal device, all the updated SIBs/system information block groups.

During specific implementation, in a possible case, the update indication may be a paging message. However, after receiving the update indication, the UE does not learn of updated SIBs/SI messages. The UE receives the MSI message broadcast by the network device. The MSI message includes identification information of the updated SIB/SI message. Then the UE determines, based on a type of the identification information of the SIB/SI message, whether the identifier of the updated SIB/SI message in the target cell is the same as the identifier that is of the SIB/SI message and that is stored by the UE, to determine whether the UE stores the updated SIB/SI message in the target cell. For a cell specific SIB/SI message, the UE determines through comparison whether an identifier of the updated cell specific SIB/SI message in the target cell is the same as an identifier that is of the cell specific SIB/SI message in the target cell and that is stored by the UE. If same indexes exist, the UE does not need to re-obtain a cell specific SIB/SI message corresponding to the same indexes, and the UE only needs to obtain a cell specific SIB/SI message corresponding to an index different from the indexes. For an area specific SIB/SI message, the UE may determine whether an updated area specific SIB/SI message corresponding to the area id is stored. If the UE already stores the area specific SIB/SI message corresponding to the area id, the UE further determines whether an index of an updated area specific SIB/SI message in the target cell is the same as an index that is of the area specific SIB/SI message corresponding to the area id and that is stored by the UE. If same indexes of an area specific SIB/SI message exist, the UE does not need to re-obtain a SIB/an SI message corresponding to the same indexes, and the UE only needs to obtain an updated area specific SIB/SI message corresponding to an index different from the indexes.

In another possible case, the paging message may be used to indicate one updated SIB/SI message or several updated SIBs/SI messages. After the UE receives system information update indication indicating updated SIBs/SI messages, the UE first obtains an index of the updated SIB/SI message from the MSI message (in an obtaining manner, the MSI message carries identification information of an independent SIB/SI message, so that the UE does not need to obtain identification information of all SIBs/SI messages; in another obtaining manner, the MSI message includes identification information of all SIBs/SI messages, and the UE sequentially reads the identification information of all the SIBs/SI messages, and then obtains the index of the updated SIB/SI message). Then the UE determines whether a version corresponding to the index is already stored, and a determining method is the same as the foregoing determining, so that a SIB/an SI message corresponding to a stored index does not need to be re-obtained. For a step of obtaining, by the UE, a SIB/SI message that is not stored, in an implementation, if the SIB/SI message is MSI, the UE reads the SIB/SI message from the broadcast MSI message. In another implementation, if the SIB/SI message is OSI, the UE may send an SI obtaining request to the network device to obtain the SIB/SI message, and the network device receives the obtaining request from the UE. If the identifier of the at least one updated SIB/system information block group is partially the same as the identifier that is of the at least one SIB/system information block group in the target cell and that is stored by the terminal device, the obtaining request is used to obtain the at least one SIB/system information block group corresponding to the identifier that is in the identifier of the at least one updated SIB/system information block group and that is different from the stored identifier of the at least one SIB/system information block group in the target cell; or if the identifier of the at least one updated SIB/system information block group is different from all of the stored identifier of the at least one SIB/system information block group in the target cell, the obtaining request is used to obtain all the updated SIBs/system information block groups. In still another implementation, scheduling information for the SIB/SI message is read from MSI, to obtain the SIB/SI message at a corresponding resource position. For example, if it is learned, based on the scheduling information, that the SIB/SI message is being broadcast in another cell at the resource position corresponding to the scheduling information, the UE may receive the broadcast SIB/SI message.

Similarly, for the SIB/SI message that needs to be obtained by the UE, if the SIB/SI message is MSI, the UE reads the SIB/SI message from the broadcast MSI message, or if the SIB/SI message is OSI, the UE may obtain the SIB/SI message by sending an SI request, or reads scheduling information for the SIB/SI message in the MSI, to obtain the SIB/SI message at a corresponding resource position.

According to the system information transmission method provided in this embodiment of the present invention, the network device broadcasts the identification information of the system information block/system information block group in the minimum system information message, and identification information corresponding to different identifiers is included based on the type of the identifier, where a quantity of bits occupied by the identifier corresponds to the type of the identifier, thereby saving network system resources; and the terminal device determines, based on the type of the identifier, an identifier to be obtained, and when the terminal device moves to the target cell or receives the update indication of the system information block/system information block group, the terminal device obtains, from the network device, a system information block/system information block group not stored by the terminal device, thereby further saving network system resources.

The method in the embodiments of the present invention is described in detail above, and an apparatus in an embodiment of the present invention is provided below.

Figure 6:
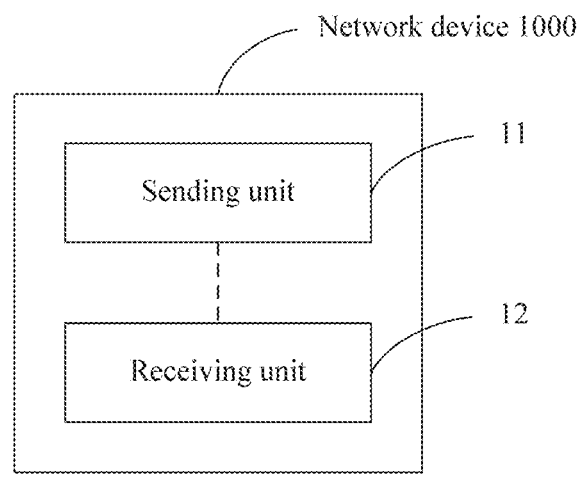
FIG. 6 is a schematic diagram of modules of a network device according to an embodiment of the present invention.

FIG. 6 is a schematic diagram of modules of a network device according to an embodiment of the present invention. The network device is applicable to the communications system described above. The network device 1000 may include a sending unit 11, and may further include a receiving unit 12 (a connection is indicated by a dashed line in the figure).

The sending unit 11 is configured to broadcast a minimum system information (MSI) message, where the MSI message includes identification information of at least one system information block (SIB)/system information block group, identification information of each SIB/system information block group includes an identifier of the SIB/system information block group and a type indication of the identifier, the identifier of each SIB/system information block group is used to indicate a version of the SIB/system information block group, and the type indication of the identifier is used to indicate that a type of the identifier of the SIB/system information block group is an area specific system information identifier or a cell specific system information identifier.

In an implementation, a bit quantity of the identifier corresponds to the type of the identifier.

In another implementation, the identification information of each SIB/system information block group further includes at least one of the following information: an indication indicating whether there is an identifier of a next SIB/system information block group, and an indication indicating whether a cell supports the system information.

In still another implementation, the MSI message further includes scheduling information for at least one other system information block/other system information block group, and the other system information block/other system information block group is a SIB/system information block group other than a minimum system information block/minimum system information block group.

In still another implementation, the scheduling information is further used to indicate a quantity and/or an arrangement order of identification information of the at least one other system information block/other system information block group.

In still another implementation, the receiving unit 12 is configured to receive an obtaining request for at least one SIB/system information block group from a terminal device, where if an identifier of the at least one SIB/system information block group is partially the same as an identifier that is of at least one SIB/system information block group in a cell in an area and that is stored by the terminal device, the obtaining request is used to request to obtain at least one SIB/system information block group corresponding to an identifier that is in the identifier of the at least one SIB/system information block group and that is different from the stored identifier of the at least one SIB/system information block group; or if an identifier of the at least one SIB/system information block group is different from all of a stored identifier of at least one SIB/system information block group, the obtaining request is used to request to obtain all SIBs/system information block groups.

The sending unit 11 is further configured to send the at least one requested SIB/system information block group to the terminal device.

According to the network device provided in this embodiment of the present invention, the network device broadcasts the identification information of the system information block/system information block group in the minimum system information message, and identification information corresponding to different identifiers is included based on the type of the identifier, thereby reducing network resource overheads.

Figure 7:
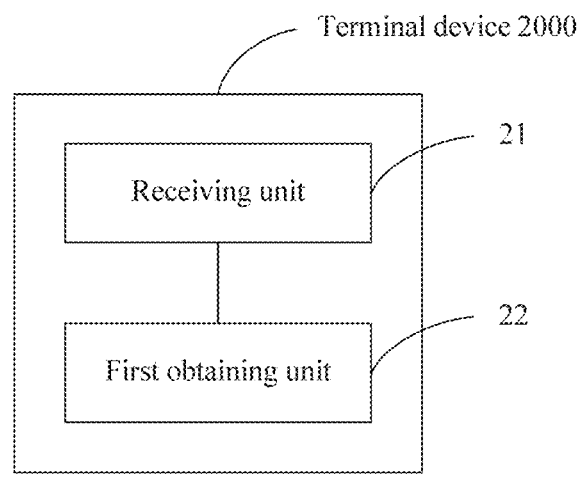
FIG. 7 is a schematic diagram of modules of a terminal device according to an embodiment of the present invention.

FIG. 7 is a schematic diagram of modules of a terminal device according to an embodiment of the present invention. The terminal device is applicable to the communications system described above. The terminal device 2000 may include a receiving unit 21 and a first obtaining unit 22.

The receiving unit 21 is configured to: when the terminal device moves to a target cell, receive a minimum system information MSI message from a network device corresponding to the target cell, where the MSI message includes identification information of at least one system information block SIB/system information block group, identification information of each SIB/system information block group includes an identifier of the SIB/system information block group and a type indication of the identifier, the identifier of each SIB/system information block group is used to indicate a version of the SIB/system information block group, and the type indication of the identifier is used to indicate that a type of the identifier of the SIB/system information block group is an area specific system information identifier or a cell specific system information identifier.

The first obtaining unit 22 is configured to: if an identifier of at least one SIB/system information block group in the target cell is partially the same as an identifier that is of at least one SIB/system information block group in a cell in an area and that is stored by the terminal device, obtain at least one SIB/system information block group corresponding to an identifier that is in the identifier of the at least one SIB/system information block group in the target cell and that is different from the stored identifier of the at least one SIB/system information block group; or if an identifier of at least one SIB/system information block group in the target cell is different from all of a stored identifier of at least one SIB/system information block group, obtain all SIBs/system information block groups in the target cell.

According to the terminal device provided in this embodiment of the present invention, the terminal device receives the identification information that is of the system information block/system information block group and that is broadcast by the network device in the minimum system information message, and identification information corresponding to different identifiers is included based on the type of the identifier, thereby reducing network resource overheads.

Figure 8:
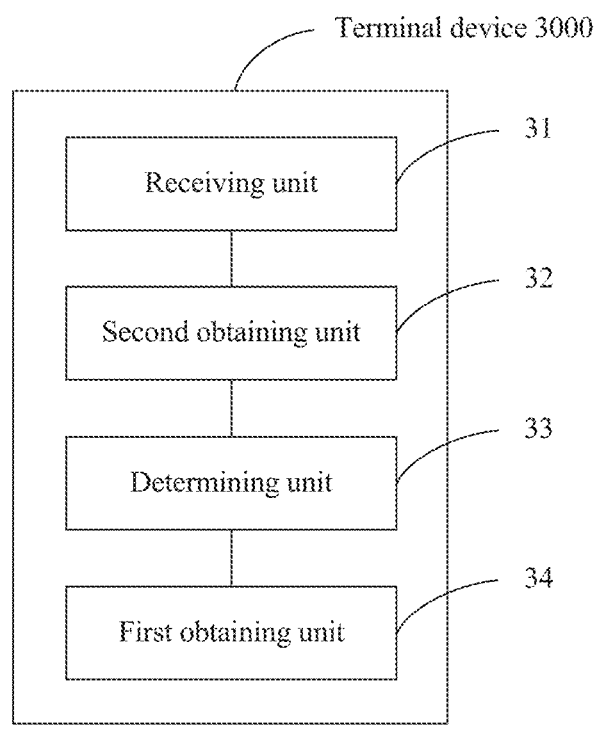
FIG. 8 is a schematic diagram of modules of another terminal device according to an embodiment of the present invention.

FIG. 8 is a schematic diagram of modules of another terminal device according to an embodiment of the present invention. The terminal device is applicable to the communications system described above. The terminal device 3000 may include a receiving unit 31, a second obtaining unit 32, a determining unit 33, and a first obtaining unit 34.

The receiving unit 31 is configured to: when the terminal device moves to a target cell, receive a minimum system information MSI message from a network device corresponding to the target cell; where the MSI message includes identification information of at least one system information block SIB/system information block group, identification information of each SIB/system information block group includes an identifier of the SIB/system information block group and a type indication of the identifier, the identifier of each SIB/system information block group is used to indicate a version of the SIB/system information block group, and the type indication of the identifier is used to indicate that a type of the identifier of the SIB/system information block group is an area specific system information identifier or a cell specific system information identifier.

The second obtaining unit 32 is configured to: obtain a type of an identifier of each SIB/system information block group in identification information of the SIB/system information block group, and obtain an identifier that is of the SIB/system information block group and that is indicated in a bit quantity corresponding to the type of the identifier, where the bit quantity of the identifier corresponds to the type of the identifier.

The determining unit 33 is configured to compare, based on the type of the identifier of the at least one SIB/system information block group in the target cell, an identifier of at least one piece of cell specific system information in the target cell with a stored identifier of at least one piece of cell specific system information in the target cell, and an identifier of at least one piece of area specific system information in the target cell with a stored identifier of at least one piece of area specific system information in the cell in the area respectively, to determine whether the identifier of the at least one SIB/system information block group in the target cell is the same as the stored identifier of the at least one SIB/system information block group.

The first obtaining unit 34 is configured to: if an identifier of at least one SIB/system information block group in the target cell is partially the same as an identifier that is of at least one SIB/system information block group in a cell in an area and that is stored by the terminal device, obtain at least one SIB/system information block group corresponding to an identifier that is in the identifier of the at least one SIB/system information block group in the target cell and that is different from the stored identifier of the at least one SIB/system information block group; or if an identifier of at least one SIB/system information block group in the target cell is different from all of a stored identifier of at least one SIB/system information block group, obtain all SIBs/system information block groups in the target cell.

Further, in an implementation, the receiving unit 31 is further configured to: when receiving an update indication of a SIB/system information block group from the network device, receive an MSI message from the network device, to obtain an identifier of at least one updated SIB/system information block group.

The first obtaining unit 34 is further configured to: if the identifier of the at least one updated SIB/system information block group is partially the same as the identifier that is of the at least one SIB/system information block group in the target cell and that is stored by the terminal device, obtain at least one SIB/system information block group corresponding to an identifier that is in the identifier of the at least one updated SIB/system information block group and that is different from the stored identifier of the at least one SIB/system information block group in the target cell; or if the identifier of the at least one updated SIB/system information block group is different from all of the stored identifier of the at least one SIB/system information block group in the target cell, obtain all the updated SIBs/system information block groups.

According to the terminal device provided in this embodiment of the present invention, the terminal device receives the identification information that is of the system information block/system information block group and that is broadcast by the network device in the minimum system information message, and identification information corresponding to different identifiers is included based on the type of the identifier, where a quantity of bits-occupied by the identifier corresponds to the type of the identifier, thereby saving network system resources; and the terminal device determines, based on the type of the identifier, an identifier to be obtained, and when the terminal device moves to the target cell or receives the update indication of the system information block/system information block group, the terminal device obtains, from the network device, a system information block/system information block group not stored by the terminal device, thereby further saving network system resources.

An embodiment of the present invention further provides a network device. The network device may be the network device in the foregoing communications system, and the network device may use a hardware architecture shown in FIG. 9. The network device may include a receiver, a transmitter, a memory, and a processor. The receiver, the transmitter, the memory, and the processor are connected to each other by using a bus. A related function implemented by the sending unit 11 in FIG. 6 may be implemented by the transmitter, and a related function implemented by the receiving unit 12 may be implemented by the receiver.

The memory includes but is not limited to a random access memory (RAM), a read-only memory (ROM), an erasable programmable read-only memory (EPROM), or a compact disc read-only Memory (CD-ROM), and the memory is configured to store a related instruction and related data.

The receiver is configured to receive data and/or a signal, and the transmitter is configured to send data and/or a signal. The transmitter and the receiver may be independent devices or an integral device such as a transceiver.

The processor may include one or more processors, for example, include one or more central processing units (CPU). When the processor is one CPU, the CPU may be a single-core CPU or a multi-core CPU.

The memory is configured to store program code and data of the network device, and may be a separate device or integrated into the processor.

The foregoing components may be integrated into a chip for implementation, for example, integrated into a baseband chip for implementation.

Specifically, the processor performs the following operation: broadcasting, by using the transmitter, a minimum system information MSI message, where the MSI message includes identification information of at least one system information block SIB/system information block group, identification information of each SIB/system information block group includes an identifier of the SIB/system information block group and a type indication of the identifier, the identifier of each SIB/system information block group is used to indicate a version of the SIB/system information block group, and the type indication of the identifier is used to indicate that a type of the identifier of the SIB/system information block group is an area specific system information identifier or a cell specific system information identifier.

In an implementation, a bit quantity of the identifier corresponds to the type of the identifier.

In another implementation, the identification information of each SIB/system information block group further includes at least one of the following information: an indication indicating whether there is an identifier of a next SIB/system information block group, and an indication indicating whether a cell supports the system information.

In still another implementation, the MSI message further includes scheduling information for at least one other system information block/other system information block group, and the other system information block/other system information block group is a SIB/system information block group other than a minimum system information block/minimum system information block group.

In still another implementation, the processor is further configured to perform the following operation: receiving, by using the receiver, an obtaining request for at least one SIB/system information block group from a terminal device, where if an identifier of the at least one SIB/system information block group is partially the same as an identifier that is of at least one SIB/system information block group in a cell in an area and that is stored by the terminal device, the obtaining request is used to request to obtain at least one SIB/system information block group corresponding to an identifier that is in the identifier of the at least one SIB/system information block group and that is different from the stored identifier of the at least one SIB/system information block group; or if an identifier of the at least one SIB/system, information block group is different from all of a stored identifier of at least one SIB/system information block group, the obtaining request is used to request to obtain all SIBs/system information block groups; and sending, by using the transmitter, the at least one requested SIB/system information block group to the terminal device.

For details, refer to the descriptions in the method embodiment. Details are not described herein again.

Figure 9:
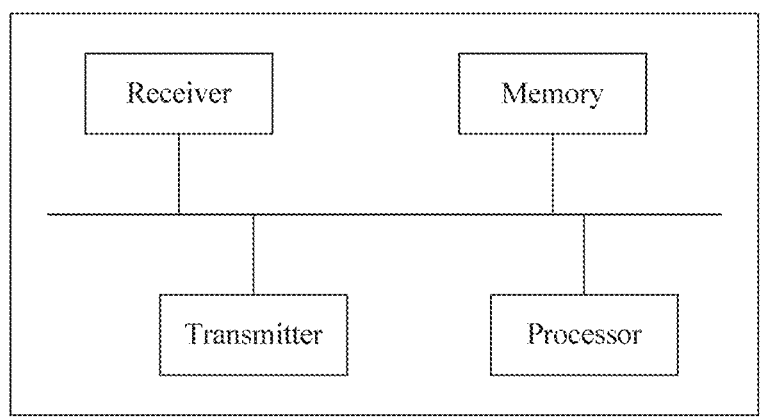
FIG. 9 is a schematic diagram of a hardware architecture of a network device/terminal device according to an embodiment of the present invention.

It may be understood that, FIG. 9 merely shows a simplified design of the network device. During actual application, the network device may also include other necessary components, including but not limited to any quantity of transceivers, processors, controllers, memories, and the like, and all network devices that can implement this embodiment of the present invention shall all fall within the protection scope of the present invention.

According to the network device provided in this embodiment of the present invention, the network device broadcasts the identification information of the system information block/system information block group in the minimum system information message, and identification information corresponding to different identifiers is included based on the type of the identifier, thereby reducing network resource overheads.

An embodiment of the present invention further provides a terminal device. The terminal device may be the terminal device in the foregoing communications system, and the terminal device may use the hardware architecture shown in FIG. 9. The terminal device may include a receiver, a transmitter, a memory, and a processor. The receiver, the transmitter, the memory, and the processor are connected to each other by using a bus. A related function implemented by the receiving unit 21 in FIG. 7 or the receiving unit 31 in FIG. 8 may be implemented by the transmitter, a related function implemented by the first obtaining unit 22 in FIG. 7 or the second obtaining unit 32, the determining unit 33, and the first obtaining unit 34 in FIG. 8 may be implemented by one or more processors.

The memory includes but is not limited to a RAM, a ROM, an EPROM, or a CD-ROM, and the memory is configured to store a related instruction and related data.

The receiver is configured to receive data and/or a signal, and the transmitter is configured to send data and/or a signal. The transmitter and the receiver may be independent devices or an integral device such as a transceiver.

The processor may include one or more processors, for example, include one or more CPUs. When the processor is one CPU, the CPU may be a single-core CPU or a multi-core CPU.

The memory is configured to store program code and data of the terminal device, and may be a separate device or integrated into the processor.

The foregoing components may be integrated into a chip for implementation, for example, integrated into a baseband chip for implementation.

Specifically, the processor performs the following operation: when the terminal device moves to a target cell, receiving, by using the receiver, a minimum system information MSI message from a network device corresponding to the target cell, where the MSI message includes identification information of at least one system information block SIB/system information block group, identification information of each SIB/system information block group includes an identifier of the SIB/system information block group and a type indication of the identifier, the identifier of each SIB/system information block group is used to indicate a version of the SIB/system information block group, and the type indication of the identifier is used to indicate that a type of the identifier of the SIB/system information block group is an area specific system information identifier or a cell specific system information identifier.

The processor is further configured to perform at least one of the following steps: if an identifier of at least one SIB/system information block group in the target cell is partially the same as an identifier that is of at least one SIB/system information block group in a cell in an area and that is stored by the terminal device, obtaining at least one SIB/system information block group corresponding to an identifier that is in the identifier of the at least one SIB/system information block group in the target cell and that is different from the stored identifier of the at least one SIB/system information block group; or if an identifier of at least one SIB/system information block group in the target cell is different from all of a stored identifier of at least one SIB/system information block group, obtaining all SIBs/system information block groups in the target cell.

In an implementation, the processor is further configured to perform the following operation: comparing, based on the type of the identifier of the at least one SIB/system information block group in the target cell, an identifier of at least one piece of cell specific system information in the target cell with a stored identifier of at least one piece of cell specific system information in the target cell, and an identifier of at least one piece of area specific system information in the target cell with a stored identifier of at least one piece of area specific system information in the cell in the area respectively, to determine whether the identifier of the at least one SIB/system information block group in the target cell is the same as the stored identifier of the at least one SIB/system information block group.

In another implementation, the processor is further configured to perform the following operation: obtaining a type of an identifier of each SIB/system information block group in identification information of the SIB/system information block group, and obtaining an identifier that is of the SIB/system information block group and that is indicated in a bit quantity corresponding to the type of the identifier, where the bit quantity of the identifier corresponds to the type of the identifier.

In still another implementation, the processor is further configured to perform the following operations: when receiving an update indication of a SIB/system information block group from the network device, receiving, by using the receiver, an MSI message from the network device, to obtain an identifier of at least one updated SIB/system information block group; and if the identifier of the at least one updated SIB/system information block group is partially the same as the identifier that is of the at least one SIB/system information block group in the target cell and that is stored by the terminal device, obtaining at least one SIB/system information block group corresponding to an identifier that is in the identifier of the at least one updated SIB/system information block group and that is different from the stored identifier of the at least one SIB/system information block group in the target cell; or if the identifier of the at least one updated SIB/system information block group is different from all of the stored identifier of the at least one SIB/system information block group in the target cell, obtaining all the updated SIBs/system information block groups.

For details, refer to the descriptions in the method embodiment. Details are not described herein again.

It may be understood that, FIG. 9 merely shows a simplified design of the terminal device. During actual application, the terminal device may also include other necessary components, including but not limited to any quantity of transceivers, processors, controllers, memories, and the like, and all terminal devices that can implement the present invention shall all fall within the protection scope of the present invention.

According to the terminal device provided in this embodiment of the present invention, the terminal device receives the identification information that is of the system information block/system information block group and that is broadcast by the network device in the minimum system information message, and identification information corresponding to different identifiers is included based on the type of the identifier, where a quantity of bits occupied by the identifier corresponds to the type of the identifier, thereby saving network system resources; and the terminal device determines, based on the type of the identifier, an identifier to be obtained, and when the terminal device moves to the target cell or receives the update indication of the system information block/system information block group, the terminal device obtains, from the network device, a system information block/system information block group not stored by the terminal device, thereby further saving network system resources.

A person of ordinary skill in the art may be aware that, in combination with the examples described in the embodiments disclosed in this specification, units and algorithm steps may be implemented by electronic hardware or a combination of computer software and electronic hardware.

Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instruction may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the processes of the methods in the embodiments may be implemented by a computer program instructing related hardware. The program may be stored in a computer-readable storage medium. When the program runs, the processes of the methods in the embodiments are performed. The foregoing storage medium includes: any medium that can store program code, such as a ROM, a random access memory RAM, a magnetic disk, or an optical disc.

What is claimed is:

1. A method comprising:
    broadcasting, by a network device, a minimum system information (MSI) message, wherein the MSI message comprises identification information of at least one system information block (SIB), respective identification information of each of the at least one SIB comprises:
        an identifier of a respective SIB included in the MSI message identifying a version of the at least one SIB; and
        a type indication of the respective SIB included in the MSI message, wherein the type indication of the respective SIB indicates whether a type of the respective SIB is area specific system information or cell specific system information, the type indication is carried in a field of the respective identification information, the field of the respective indication information is dedicated to indicating whether the respective SIB is area specific information or cell specific information, and the type indication of the respective SIB is one bit long.

2. The method according to claim 1, wherein a bit quantity of the identifier of the respective SIB corresponds to the type of the respective SIB.

3. The method according to claim 1, wherein the identification information of each of the at least one SIB further comprises:
    an indication indicating whether there is an identifier of a next SIB; or
    an indication indicating whether a cell supports system information.

4. The method according to claim 1, wherein the MSI message further comprises scheduling information for another system information block, and the another system information block is not a minimum SIB.

5. The method according to claim 1, wherein the method further comprises:
    receiving, by the network device, an obtaining request for at least one SIB from a terminal device, wherein:
        when an identifier of the at least one SIB in the obtaining request is partially the same as an identifier of at least one SIB in a cell in an area and that is stored by the terminal device, the obtaining request requests to obtain at least one SIB corresponding to an identifier of the at least one SIBs in the obtaining request and that is different from the identifier of the at least one SIB stored by the terminal device; or
        when an identifier of the at least one SIB in the obtaining request is different from all identifiers of all SIBs stored by the terminal device, the obtaining request requests to obtain all SIBs in the obtaining request; and
    sending, by the network device, the at least one SIB requested by the obtaining request to the terminal device.

6. The method according to claim 1, wherein:
    a network comprises a plurality of areas, area identifiers of adjacent areas in the plurality of areas are different, and each of the plurality of areas is determined by system information corresponding to the identification information of the at least one SIB.

7. A method, comprising:
receiving, by a terminal device, a minimum system information (MSI) message from a network device corresponding to a target cell, wherein the MSI message comprises identification information of at least one system information block (SIB), respective identification information of each of the at least one SIB comprises:
an identifier of a respective SIB included in the MSI message identifying a version of the at least one SIB; and
a type indication of the respective SIB included in the MSI message, wherein the type indication of the respective SIB indicates whether a type of the respective SIB is area specific system information or cell specific system information, the type indication is carried in a field of the respective identification information, the field of the respective indication information is dedicated to indicating whether the respective SIB is area specific information or cell specific information, and the type indication of the respective SIB is one bit long; and
further performing, by the terminal device:
when an identifier of the at least one SIB in the target cell is partially the same as an identifier of at least one SIB in a cell in an area and that is stored by the terminal device, obtaining, by the terminal device, at least one SIB corresponding to an identifier of the at least one SIB in the target cell and that is different from the identifier of the at least one SIB stored by the terminal device; or
when an identifier of the at least one SIB in the target cell is different from all identifiers of all SIBs stored by the terminal device, obtaining, by the terminal device, all SIBs in the target cell.

8. The method according to claim 7, wherein before obtaining, by the terminal device, the at least one SIB in the target cell, the method further comprises:
comparing, by the terminal device according to a type indication of the at least one SIB in the target cell, an identifier of cell specific system information in the target cell with a stored identifier of cell specific system information in the target cell, and comparing an identifier of area specific system information in the target cell with a stored identifier of area specific system information in the cell in the area, to determine whether the identifier of the at least one SIB in the target cell is the same as the identifier of the at least one SIB stored by the terminal device.

9. The method according to claim 7, wherein after receiving, by a terminal device, a minimum system information (MSI) message from the network device corresponding to the target cell, the method further comprises:
obtaining, by the terminal device, a respective type indication of each of the at least one SIB in the identification information of the at least one SIB; and
obtaining the respective identifier of the respective SIB as indicated in a bit quantity corresponding to a type of the respective identifier, wherein the bit quantity of the respective identifier corresponds to the respective type of the respective SIB.

10. The method according to claim 7, wherein after obtaining, by the terminal device, the at least one SIB, the method further comprises:
when the terminal device receives an update indication of at least one updated SIB from the network device, receiving, by the terminal device, an MSI message from the network device, to obtain an identifier of the at least one updated SIB; and
the method further comprises:
when the identifier of the at least one updated SIB is partially the same as the identifier that is of the at least one SIB in the target cell and that is stored by the terminal device, obtaining, by the terminal device, at least one SIB corresponding to an identifier of the at least one updated SIB and that is different from the identifier of the at least one SIB in the target cell; or
when the identifier of the at least one updated SIB is different from all identifiers of the at least one SIB in the target cell, obtaining, by the terminal device, all the at least one updated SIB.

11. The method according to claim 7, wherein a network comprises a plurality of areas, area identifiers of adjacent areas in the plurality of areas are different, and each of the plurality of areas is determined by system information corresponding to the identification information of the at least one (SIB).

12. The method according to claim 7, further comprising:
reading, by the terminal device, a type indication bit of the at least one SIB in the identification information, wherein a bit quantity of an identifier of a respective one of the at least one SIB corresponds to a type of the respective one of the at least one SIB;
determining the bit quantity of the identifier of the respective one of the at least one SIB according to the type indication bit; and
reading the identifier of the respective one of the at least one SIB from the bit quantity.

13. A network device, comprising:
a transmitter, configured to broadcast a minimum system information (MSI) message, wherein the MSI message comprises identification information of at least one system information block (SIB), respective identification information of each of the at least one SIB comprises:
an identifier of a respective SIB included in the MSI message identifying a version of the at least one SIB; and
a type indication of the respective SIB included in the MSI message, wherein the type indication of the respective SIB indicates whether a type of the respective SIB is area specific system information or cell specific system information, the type indication is carried in a field of the respective identification information, the field of the respective indication information is dedicated to indicating whether the respective SIB is area specific information or cell specific information, and the type indication of the respective SIB is one bit long.

14. The network device according to claim 13, wherein a bit quantity of the identifier of the respective SIB corresponds to the type of the respective SIB.

15. The network device according to claim 13, further comprising:
a receiver, configured to receive an obtaining request for at least one SIB from a terminal device, wherein:
when an identifier of the at least one SIB in the obtaining request is partially the same as an identifier of at least one SIB in a cell in an area and that is stored by the terminal device, the obtaining request requests to obtain at least one SIB corresponding to an identifier of the at least one SIBs in the obtaining request and that is different from the identifier of the at least one SIB stored by the terminal device; or when an identifier of the at least one SIB in the obtaining request is different from all identifiers of all SIBs stored by the terminal device, the obtaining request requests to obtain all SIBs in the obtaining request; and the transmitter is further configured to send the at least one SIB requested by the obtaining request to the terminal device.

16. The network device according to claim 13, wherein a network comprises a plurality of areas, area identifiers of adjacent areas in the plurality of areas are different, and each of the plurality of areas is determined by system information corresponding to the identification information of the at least one SIB.

17. A terminal device, comprising:
a receiver, configured to receive a minimum system information (MSI) message from a network device corresponding to a target cell, wherein the MSI message comprises identification information of at least one system information block (SIB), respective identification information of each of the at least one SIB comprises:
an identifier of a respective SIB included in the MSI message identifying a version of the at least one SIB; and
a type indication of the respective SIB included in the MSI message, wherein the type indication of the respective SIB indicates whether a type of the respective SIB is area specific system information or cell specific system information, the type indication is carried in a field of the respective identification information, the field of the respective indication information is dedicated to indicating whether the respective SIB is area specific information or cell specific information, and the type indication of the respective SIB is one bit long; and
a processor configured to:
when an identifier of the at least one SIB in the target cell is partially the same as an identifier of at least one SIB in a cell in an area and that is stored by the terminal device, obtain at least one SIB corresponding to an identifier of the at least one SIB in the target cell and that is different from the identifier of the at least one SIB stored by the terminal device; or when an identifier of the at least one SIB in the target cell is different from all identifiers of all SIBs stored by the terminal device, obtain all SIBs in the target cell.

18. The terminal device according to claim 17, wherein the processor is further configured to:
compare, according to a type indication of the at least one SIB in the target cell, an identifier of cell specific system information in the target cell with a stored identifier of cell specific system information in the target cell, and compare an identifier of area specific system information in the target cell with a stored identifier of area specific system information in the cell in the area, to determine whether the identifier of the at least one SIB in the target cell is the same as the identifier of the at least one SIB stored by the terminal device; or read a type indication bit of the at least one SIB in the identification information, wherein a bit quantity of an identifier of a respective one of the at least one SIB corresponds to a type of the respective one of the at least one SIB, determine the bit quantity of the identifier of the respective one of the at least one SIB according to the type indication bit; and read the identifier of the respective one of the at least one SIB from the bit quantity.

19. The terminal device according to claim 17, wherein:
the receiver is further configured to: when receiving an update indication of at least one updated SIB from the network device, receive an MSI message from the network device, to obtain an identifier of the at least one updated SIB; and the processor is further configured to:
when the identifier of the at least one updated SIB is partially the same as the identifier that is of the at least one SIB in the target cell and that is stored by the terminal device, obtain at least one SIB corresponding to an identifier of the at least one updated SIB and that is different from the identifier of the at least one SIB in the target cell; or when the identifier of the at least one updated SIB is different from all identifiers of the at least one SIB in the target cell, obtain all the at least one updated SIBs.

* * * * *